(12) United States Patent
Abdullah et al.

(10) Patent No.: US 10,594,395 B2
(45) Date of Patent: Mar. 17, 2020

(54) SYSTEMS AND METHODS FOR COMPENSATING COHERENT OPTICS DELAY ASYMMETRY IN A PACKET OPTICAL NETWORK

(71) Applicant: Ciena Corporation, Hanover, MD (US)

(72) Inventors: Bashar Abdullah, Kanata (CA); Daniel Perras, Ottawa (CA); Sebastien Gareau, Ottawa (CA); Xiaojin Liu, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/042,671

(22) Filed: Jul. 23, 2018

(65) Prior Publication Data

US 2020/0028585 A1 Jan. 23, 2020

(51) Int. Cl.
*H04B 10/50* (2013.01)
*H04B 10/079* (2013.01)
*H04L 7/00* (2006.01)
*H04Q 11/00* (2006.01)

(52) U.S. Cl.
CPC ....... *H04B 10/0795* (2013.01); *H04L 7/0075* (2013.01); *H04Q 11/0066* (2013.01)

(58) Field of Classification Search
CPC ............................ H04B 10/50; H04B 10/0795
See application file for complete search history.

(56) References Cited

U.S. PATENT DOCUMENTS

| | | |
|---|---|---|
| RE38,619 E | 10/2004 | Paratore et al. |
| 6,816,510 B1 | 11/2004 | Banerjee |
| 6,839,858 B1 | 1/2005 | James et al. |
| 6,868,092 B1 | 3/2005 | Bell et al. |
| 7,181,545 B2 | 2/2007 | Dziawa et al. |
| 7,835,366 B2 | 11/2010 | Aweya et al. |
| 8,370,704 B2 | 2/2013 | Ganga et al. |
| 8,594,018 B2 | 11/2013 | Richards et al. |
| 8,630,315 B2 | 1/2014 | Rivaud et al. |
| 8,718,471 B2 | 5/2014 | Prakash et al. |
| 8,737,389 B2 | 5/2014 | Chiesa et al. |
| 9,276,689 B2 | 3/2016 | Geva et al. |
| 9,432,144 B2 | 8/2016 | Gareau et al. |
| 2004/0006645 A1 | 1/2004 | Dziawa et al. |
| 2006/0007943 A1 | 1/2006 | Fellman |

(Continued)

OTHER PUBLICATIONS

Roberts, et al., "Flexible Transceivers," ECOC Technical Digest, 2012 OSA, pp. 1-3.

(Continued)

*Primary Examiner* — Shi K Li
(74) *Attorney, Agent, or Firm* — Clements Bernard Walker; Christopher L. Bernard; Lawrence A. Baratta, Jr.

(57) ABSTRACT

Systems and methods of compensating for the delay asymmetry of coherent optical modems in a packet optical network include measuring fill levels of one or more queues each including an elastic First-In-First-Out (FIFO) circuit used in a transport mapping scheme, wherein the transport mapping scheme is one or more of client mapping to Optical Transport Unit (OTU) and OTU mapping to Flexible OTN (FlexO); and performing adjustments in a clock based in part on the measured fill levels, wherein the adjustments are configured to reduce a Time Error (TE) in the packet network based on delay asymmetry between two nodes.

18 Claims, 5 Drawing Sheets

(56) References Cited

U.S. PATENT DOCUMENTS

| | | |
|---|---|---|
| 2006/0109805 A1 | 5/2006 | Malamal Vadakital et al. |
| 2008/0069248 A1 | 3/2008 | Heise et al. |
| 2008/0256272 A1* | 10/2008 | Kampmann ...... H04L 29/06027 710/57 |
| 2009/0297164 A1 | 12/2009 | Horiuchi |
| 2010/0042883 A1 | 2/2010 | Heise |
| 2010/0150243 A1 | 6/2010 | Kure et al. |
| 2011/0019681 A1 | 1/2011 | Gazier et al. |
| 2011/0076031 A1* | 3/2011 | Surek ...................... H04J 3/0682 398/161 |
| 2011/0252265 A1 | 10/2011 | Iwami et al. |
| 2011/0255546 A1 | 10/2011 | Pallee et al. |
| 2011/0274149 A1 | 11/2011 | Xu et al. |
| 2012/0213508 A1 | 8/2012 | Moynihan |
| 2012/0224846 A1 | 9/2012 | Swanson et al. |
| 2012/0275501 A1 | 11/2012 | Rotenstein |
| 2013/0045005 A1 | 2/2013 | Nakura et al. |
| 2013/0129345 A1 | 5/2013 | Meng et al. |
| 2013/0136218 A1 | 5/2013 | Kure et al. |
| 2013/0148768 A1* | 6/2013 | Kim ...................... H04H 20/67 375/354 |
| 2013/0272143 A1 | 10/2013 | Schoppmeier |
| 2013/0301634 A1 | 11/2013 | Ehlers et al. |
| 2013/0308349 A1 | 11/2013 | Young et al. |
| 2014/0079409 A1 | 3/2014 | Ruffini et al. |
| 2014/0093235 A1 | 4/2014 | Gareau et al. |
| 2014/0177653 A1 | 6/2014 | Tzeng |
| 2014/0219651 A1 | 8/2014 | Ruffini et al. |
| 2014/0269778 A1 | 9/2014 | Yang et al. |
| 2014/0348184 A1 | 11/2014 | Kure |
| 2014/0355986 A1 | 12/2014 | Trojer et al. |
| 2017/0005949 A1 | 1/2017 | Gareau |
| 2017/0093757 A1 | 3/2017 | Gareau et al. |
| 2017/0317759 A1* | 11/2017 | Agazzi .................. H04B 10/40 |
| 2019/0098381 A1* | 3/2019 | Su ........................ H04J 3/1658 |

OTHER PUBLICATIONS

Roberts, et al., "100G and Beyond with Digital Coherent Signal Processing," IEEE Communications Magazine, Jul. 2010, pp. 62-69.
Gamer, "IEEE 1588 Version 2, " ISPCS, Sep. 24, 2008, slides 1-89.
Gho, et al., "Rate-Adaptive Coding for Optical Fiber Transmission Systems," Journal of Lightwave Technology, vol. 29, No. 2, Jan. 15, 2011, pp. 222-233.
ITU-T, Telecommunication Standardization Sector of ITU, "Precision time protocol telecom profile for frequency synchronization," International Telecommunication, Jul. 2014, pp. 1-28.
ITU-T, Telecommunication Standardization Sector of ITU, G.709.1/Y.1331.1, "Flexible OTN short-reach interface", Jan. 2017, pp. 1-30.
ITU-T, Telecommunication Standardization Sector of ITU, G.7091Y.1331, "Interfaces for the optical transport network", Jun. 2016, pp. 1-172.

\* cited by examiner

SYSTEMS AND METHODS FOR COMPENSATING COHERENT OPTICS DELAY ASYMMETRY IN A PACKET OPTICAL NETWORK

FIELD OF THE DISCLOSURE

The present disclosure generally relates to optical networking. More particularly, the present disclosure relates to systems and methods for compensating coherent optics delay asymmetry in a packet optical network.

BACKGROUND OF THE DISCLOSURE

Timing accuracy is important in various network applications, such as wireless base station synchronization, etc. Packet networks operate over optical networks which are evolving to use Optical Transport Network (OTN), Flexible Optical (FlexO), and coherent optics. Frequency synchronization across a network was been previously performed with Synchronous Optical Network (SONET), Synchronous Digital Hierarchy (SDH), and synchronous Ethernet. Timing distribution has been evolved to use IEEE 1588 to enable phase and time synchronization across a network. Timing accuracy is more difficult with OTN and coherent optics with OTN having asynchronous mappings and coherent optics introducing variable delays which may be different in a transmit and receive direction.

Timing synchronization between nodes in a network is described in various standards such as IEEE 1588-2008 "Standard for a Precision Clock Synchronization Protocol for Networked Measurement and Control Systems," ITU-T G.8265.1/Y.1365.1 (07/14) "Precision time protocol telecom profile for frequency synchronization," ITU-T G.8275.1 "Time and Phase Profile," the contents of each is incorporated by reference herein. The requisite information for the transfer of precise time is (1) a time reference point, or "significant instant" to which timing information can be related, (2) the timing information itself, and (3) a measure of the delay it takes to transfer the timing information between two nodes. The transfer of time over optical networks can be challenging because of delays introduced by elastic First-In-First-Out (FIFO) or queues required in transport mapping schemes such as OTN and enhanced high coding gain Soft-Decision Forward Error Correction (SD-FEC) schemes. Variability in these delays (at start-up, or after fault recovery) can result in different delays in the forward and reverse direction, referred to as delay asymmetry. When transferring time across a network, the delay asymmetry results in a time error.

IEEE 1588-2008 is referred to as Precision Time Protocol (PTP) and is used to synchronize clocks throughout the network. IEEE 1588-2008 defines a protocol for transferring time information over a packet network. It does not address performance aspects such as the time accuracy that can be achieved over a network. Based on current 100 Gb/s system designs, measurements have shown that the optical transport equipment can contribute hundreds of nanoseconds of time uncertainty over a single network hop. Measurements of some off-the-shelf components have shown much worse performance. Newly developed standards have not yet addressed time uncertainty and jitter that can be introduced by SD-FEC type of schemes added on the line side in optical modem/Digital Signal Processing (DSP) devices. These schemes and devices have non-deterministic timing therein.

Commonly-assigned U.S. Pat. No. 9,432,144, issued Aug. 30, 2016, and entitled "PRECISION TIME TRANSFER SYSTEMS AND METHODS IN OPTICAL NETWORKS," the contents of which are incorporated herein by reference, describes an improvement in accuracy by transferring time in a coherent optics module in a FEC layer to avoid any delay asymmetry introduced therein. Commonly-assigned U.S. patent application Ser. No. 15/878,703, filed Jan. 24, 2018, and entitled "SYSTEMS AND METHODS FOR PRECISE TIME SYNCHRONIZATION WITH OPTICAL MODULES," the contents of which are incorporated herein by reference, describes an IEEE-1588 transparent clock and/or timestamping inside a digital coherent optical module (e.g., CFP2-DCO) or onboard optics (e.g., COBO). These disclosures address some problems associated with delay asymmetry, using hardware implementations.

BRIEF SUMMARY OF THE DISCLOSURE

The systems and methods described herein provide an approach to reduce delay asymmetry in coherent optics, via a software implementation, which can be implemented in optical modems, DSP devices, packet switches, routers and the like that do not have time transfer functions already built-in through hardware functions.

In an embodiment, a method of compensating coherent optical modems delay asymmetry in a packet optical network includes measuring fill levels of one or more queues each including an elastic First-In-First-Out (FIFO) circuit used in a transport mapping scheme, wherein the transport mapping scheme is one or more of client mapping to Optical Transport Unit (OTU) and OTU mapping to Flexible OTN (FlexO); and performing adjustments in a clock based in part on the measured fill levels, wherein the adjustments are configured to reduce a Time Error (TE) in the packet network based on delay asymmetry between two nodes. The measuring fill levels can include measuring the fill levels at a first node for a first measurement and at a second node for a second measurement, wherein the adjustments can include the second node adjusting its clock based on a difference between the forward and reverse delays between the two nodes. The method can further include signaling the measured fill levels to a remote node. The signaling can utilize one of in-band signaling via overhead and/or out-of-band signaling through one of an Optical Service Channel (OSC) and/or an out-of-band data channel.

The method can further include obtaining a desired value of time delay, wherein the adjustments include one or more of adjustments of a phase of the clock and adjustments of justification control signals configured to drive the one or more queues, to address any difference between the measured fill levels and the desired value. The clock can clock is utilized to implement one or more of IEEE 1588 Precision Time Protocol (PTP), Network Time Protocol (NTP), or other packet timing protocol using a clock servo for clock recovery. The method can further include signaling the adjustments to one or more nodes in the packet optical network.

In another embodiment, a coherent optical module includes client-to-Optical Transport Unit (OTU) adaptation circuitry; OTU-to-Flexible OTN (FlexO) adaptation circuitry; Forward Error Correction (FEC) circuitry; and a Digital Signal Processor (DSP), wherein the client-to-OTU adaptation circuitry and the OTU-to-FlexO adaptation circuitry include one or more queues each including an elastic First-In-First-Out (FIFO) circuit used in a transport mapping scheme, and wherein fill levels of the one or more queues are measured and adjustments are performed to a clock based in part on the measured fill levels, wherein the adjustments are configured to reduce a Time Error (TE) in the packet network based on delay asymmetry between two nodes.

In another embodiment, a node in a packet optical network includes a coherent optical module communicatively coupled to a remote node in the packet network, wherein the coherent optics module includes client-to-Optical Transport Unit (OTU) adaptation circuitry and OTU-to-Flexible OTN (FlexO) adaptation circuitry; wherein the client-to-OTU adaptation circuitry and the OTU-to-FlexO adaptation circuitry include one or more queues each including an elastic First-In-First-Out (FIFO) circuit used in a transport mapping scheme, and wherein fill levels of the one or more queues are measured and adjustments are performed to a clock based in part on the measured fill levels, wherein the adjustments are configured to reduce a Time Error (TE) in the packet network based on delay asymmetry between the node and the remote node.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for compensating coherent optics delay asymmetry in a packet network. The systems and methods include a software implementation, which can be implemented in optical modems, DSP devices, packet switches, routers, and the like. The systems and methods address delay asymmetry associated with any part of the coherent optics circuitry for which the delay can be measured and may include client-to-Optical Transport Unit (OTU) adaptation, OTU-to-FlexO adaptation, SD_FEC processing and DSP processing. The systems and methods include various example embodiments which manage queues (e.g., FIFO) in circuitry associated with the client-to-OTU adaptation and OTU-to-FlexO adaptation. First, the queue fill values of the coherent optic along the path can be communicated to a clock and the values can be used by a clock recovery process to compensate the path delay asymmetry. These values can be communicated in-band (e.g., General Communication Channel (GCC) in OTN) or out-of-band (e.g., Optical Service Channel (OSC), Ethernet, etc.) along a unidirectional path. Second, the queue fill values of a single coherent optics can be used by the coherent optics to calculate and compensate for its delay asymmetry. Third, a software implementation can extract a state of hardware to provide a process for compensating for delay asymmetry.

Optical Network

Figure 1:
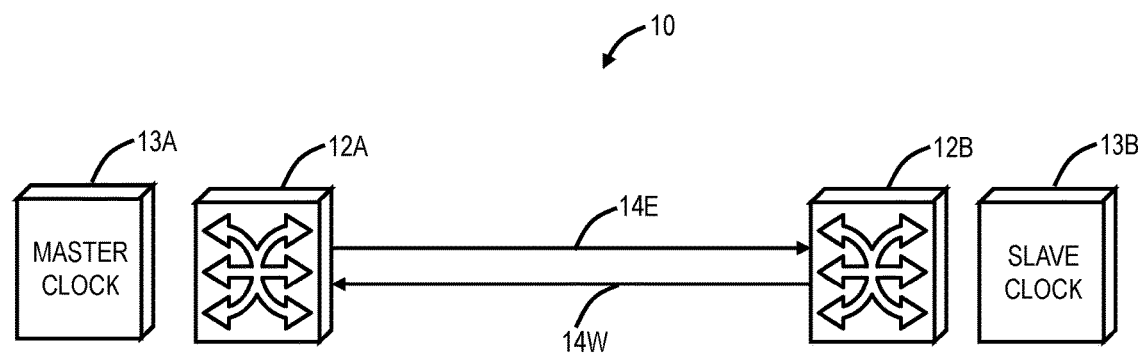
FIG. 1 is a network diagram of an example optical network with two nodes, one as master and the other as slave.

FIG. 1 is a network diagram of an example optical network 10 with two nodes 12A, 12B. The nodes 12A, 12B each have a clock 13A, 13B and are interconnected by links 14E, 14W providing bidirectional communication. In this example, the clock 13A is a master clock and the clock 13B is a slave clock that can be adjusted based on the master clock. The links 14E, 14W are optical fibers and the nodes 12A, 1B are optical network elements, such as shown, for example, in FIG. 7. The nodes 12A, 12B can provide packet data over the links 14E, 14W. The nodes 12A, 12B each have an associated clock, and an objective of the systems and methods is to ensure the paths have similar timing latencies. The optical network 10 can be a wavelength division multiplexing (WDM) network with one or more wavelengths over the links 14E, 14W, and employs OTN and other protocols such as Ethernet, etc. Note, the optical network 10 is presented for illustration purposes to describe the systems and methods. Practical embodiments contemplate additional nodes in various interconnection architectures, including additional network elements for packet switching, etc. Further, the systems and methods, while illustrated between the two nodes 12A, 12B, can be implemented through any size network. For example, assume the two nodes 12A, 12B are providing mobile backhaul, i.e., between base stations. As is described herein, the delay asymmetry introduced by coherent modems and optics on each of the links 14E, 14W can contribute a significant amount of the timing error budget for entire mobile backhaul path.

Node Functionality in the Optical Network

Figure 2:
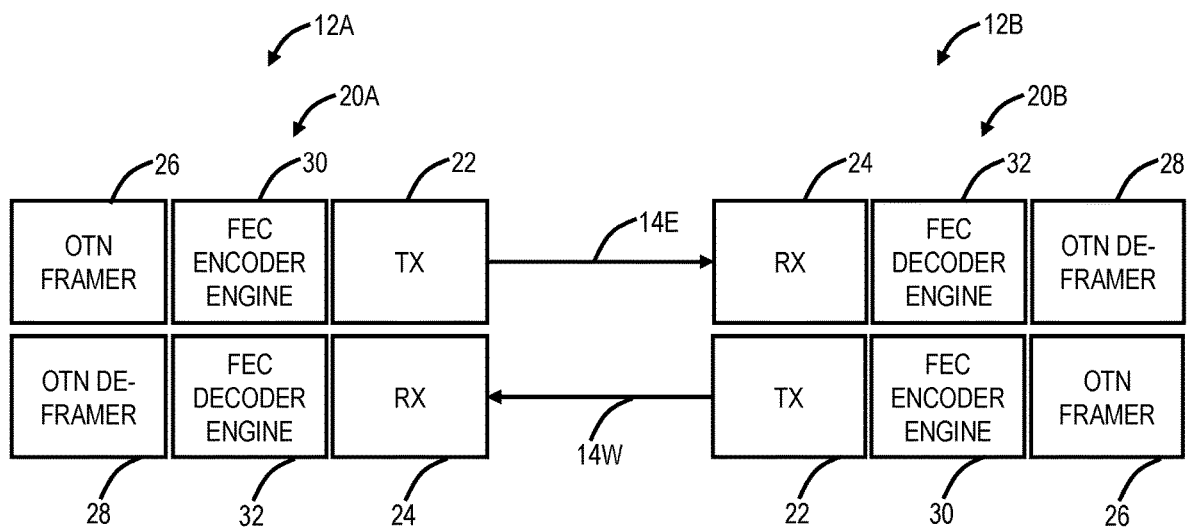
FIG. 2 is a block diagram of the optical network showing functionality at the nodes.

FIG. 2 is a block diagram of the optical network 10 showing logical functionality at the nodes 12A, 12B. The nodes 12A, 12B each include an optical modem 20A, 20B with a transmitter and receiver to communicate over the links 14E, 14W. Specifically, the modems 20A, 20B can each include a transmitter (TX) 22, a receiver (RX) 24, an OTN framer 26, an OTN de-framer 28, a FEC encoder engine 30, and a FEC decoder engine 32. Note, the modems 20A, 20B can include various additional functionality, which is omitted for illustration purposes. Also, the various functional components 22-32, while illustrated separately, can be realized in integrated hardware. The TX 22 of the modem 20A communicates with the RX 24 of the modem 20B, over the link 14E, and the TX 22 of the modem 20B communicates with the RX 24 of the modem 20A, over the link 14, thus forming the bidirectional communication.

Describing the signal flow from the modem 20A to the modem 20B, the OTN framer 26 is configured to frame an incoming signal with OTN overhead and perform overhead processing therein. The FEC encoder engine 30 is configured to receive an OTN signal from the OTN framer 26 and encode the OTN signal, for example, with Soft Decision (SD) FEC (SD-FEC). The transmitter 22 is configured to optically transmit an SD-FEC encoded, line adapted signal to the RX 24, which optically receives the SD-FEC encoded, line adapted signal and converts it to an electrical received signal. The FEC decoder engine 32 receives the electrical received signal and performs SD-FEC decoding to provide an error corrected signal. The OTN de-framer 28 processes the OTN overhead from the error corrected signal.

The modems 20A, 20B are coherent optical modems with Digital Signal Processing (DSP) therein. The modems 20A, 20B can support programmable modulation, or constellations with both varying phase and/or amplitude. In an embodiment, such a flexible optical modem can support multiple coherent modulation formats. With associated digital signal processing (DSP) in the modem 20A, 20B hardware, moving from one modulation format to another is completely software-programmable.

Delay Uncertainty in Coherent Optics

Figure 3:
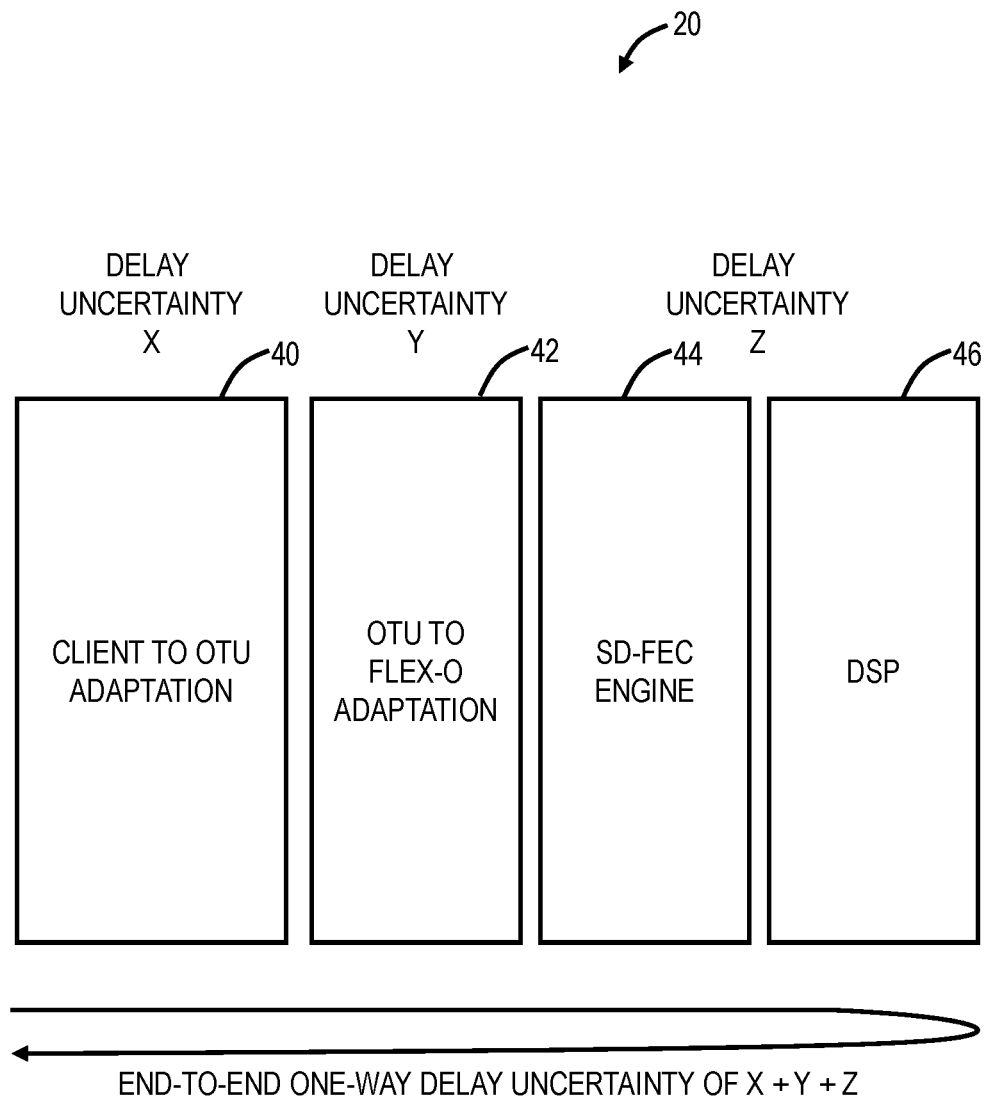
FIG. 3 is a block diagram of an optical modem illustrating timing uncertainty therein.

FIG. 3 is a block diagram of an optical modem 20 illustrating delay asymmetry therein. The optical modem 20 includes various circuitry including client-to-OTN adaptation 40, OTN-to-FlexO adaptation 42, an SD-FEC engine 44, and a DSP 46. For example, client 100 GbE signals are mapped to OTN via the client-to-OTN adaptation 40, adapted to FlexO via the OTN-to-FlexO adaptation 42, FEC encoded via the SD-FEC engine 44, then passed to the DSP 46. FIG. 3 represents a generalized architecture for coherent modems.

OTN is generally described in ITU-T Recommendation G.709/Y.1331 (06/16) "Interfaces for the optical transport network," the contents of which are incorporated by reference herein. The client-to-OTN adaptation 40 includes mapping client signals (of various protocols) into OTN signals, e.g., Optical Channel Data Unit k (ODUk) where k=0, 1, 2, 2e, 3, 4, flex or Optical Transport Unit Cn (OTUCn) where C stands for 100 and n≥1 FlexO is generally described in ITU-T Recommendation G.709.1/Y.1331.1 (01/17) and G.709.2/Y.1331.2 (02/18) "Flexible OTN short-reach interface," the contents of which are incorporated herein by reference herein. The OTN-to-FlexO adaptation 42 generally includes adapting OTN mapped signals into an n×100 Gb/s FlexO group interface.

Generally, the client-to-OTN adaptation 40 maps client signals to OTN and the OTN-to-FlexO adaptation 42 maps OTN signals to FlexO. The FlexO format is used to decouple the logical mapping from the actual physical transport. For example, a 400 G OTUC4 signal may be actually transported over two 200 G modems. Thus, there is no longer a requirement for a one-to-one mapping between OTN signal and optical modem, FlexO decouples the OTN client from the line(s).

The client-to-OTN adaptation 40 can have a delay uncertainty of X, the OTN-to-FlexO adaptation 42 can have a delay uncertainty of Y, and the SD-FEC engine 44 and the DSP 46 can have a delay uncertainty of Z. Accordingly, the end-to-end one-way delay uncertainty in the optical modem 20 can be X+Y+Z. These delay values can typically be in nanoseconds.

The mapping to OTN in the client-to-OTN adaptation 40 is an adaptive mapping and uses a FIFO at both the on-ramp and off-ramp to accommodate for the rate adaptation between the client clock and the OTN server clock and to accommodate the gaps due to the OTN overhead. The adaptation to FlexO in the OTN-to-FlexO adaptation 42 uses a FIFO in the off-ramp direction to deskew multiple FlexO lanes (in case they take different paths through the network). The SD-FEC engine 44 may also employ a FIFO that used to store FEC symbols while prior symbols are being corrected. When a client service is restored (after power-up or the clearing of a defect), each FIFO performs a centering operation to sets its average fill level to its mid-point. The centering operation of typical OTN mappers, favor fast recovery, rather than deterministic average latency. Thus, the operation of such circuits can be a significant contributor to the latency uncertainty. Mobile backhaul is an important application with respect to timing accuracy, e.g., ensuring base stations are synchronized for handoffs, etc. Based on analysis, FIFO fill variability contributes to a Time Error (TE) which is a significant portion of an end-to-end IEEE 1588v2 timing network TE budget. For example, just using two coherent modems 20 can consume a significant portion (e.g., more than 50%) of the TE budget for a mobile backhaul application.

The variability in the FIFO buffer fill at each end of the coherent link will introduce delay asymmetry. Note, the typical approach to timing synchronization is to measure the round-trip latency (e.g., from the node 12A to the node 12B and back from the node 12B to the node 12A, i.e., over both the links 14A, 14B). With the delay asymmetry, the round-trip latency divided by two may not be the same as either uni-directional latency measures, e.g., the delay between the links 14E, 14W may be different. This asymmetry will lead to differences in timing at each node 12A, 12B. In a non-coherent network, this is a constant time error (TE) that could be compensated for by either end of this asymmetry. However, since this asymmetry varies each time the FIFO fill pointer is set after the coherent line comes up, this has a direct impact on the TE. The fibers have not changed (barring environmental changes), but the latency does change.

IEEE 1588v2 is a common way to achieve time synchronization across a packet network. This protocol facilitates time synchronization by transferring time information in packets between network nodes 12A, 12B. To synchronize time, a master clock sends time information to a slave clock. In addition, a round trip delay measurement is used to estimate the delay between the master clock and the slave clock. With the time information from the master and an estimate on the packet trip delay, the slave clock can synchronize its local time base to the master clock. Because a round trip delay measurement is used to estimate the one-way delay, the achievable accuracy of time synchronization at the slave clock is dependent upon the forward and reverse path delays being equal. Any difference between the forward and reverse path delays, known as delay asymmetry, will result in a time error if it is not compensated for.

The systems and methods address this delay asymmetry from the perspective of the client-to-OTN adaptation 40 and the OTN-to-FlexO adaptation 42. Specifically, the systems and methods compensate for the time error contributed by a single pair of coherent optics which can be a significant contributor to the total time error budget for a packet timing network. The ability to compensate for a majority of the time error contributed by coherent optics improves the performance of a packet timing solution.

Compensation Process

Figure 4:
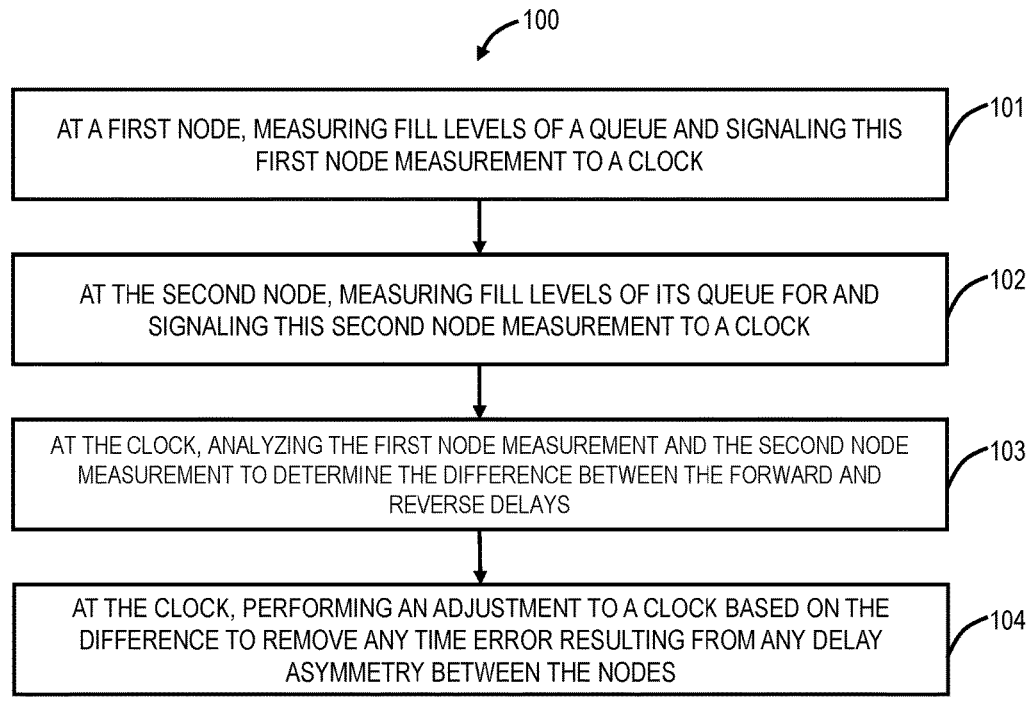
FIG. 4 is a flowchart of a process compensating for coherent optics delay asymmetry in a packet network where one node adjusts it's time to another node.
Figure 5:
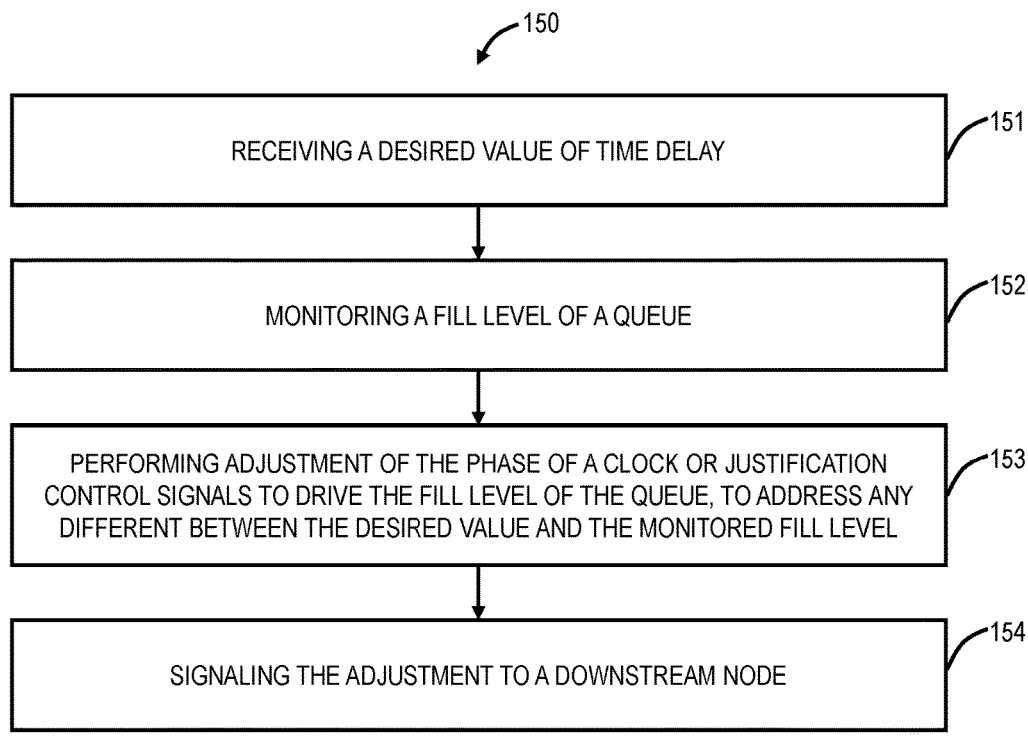
FIG. 5 is a flowchart of a process compensating for coherent optics delay asymmetry in a packet network where a node adjusts it's time to the desired value.

FIG. 4 is a flowchart of a process 100 for compensating for delay asymmetry introduced by coherent optics time error in a packet network where the nodes 12A, 12B measure their latency and communicate for synchronizing the clocks 13A, 13B to compensate for the delay asymmetry. FIG. 5 is a flowchart of a process 150 for compensating for the delay asymmetry introduced by coherent optics in a packet network where the nodes 12A, 12B adjust their latency to a desired value. The processes 100, 150 are performed through the circuitry associated with the client-to-OTN adaptation 40 and the OTN-to-FlexO adaptation 42. For example, the systems and methods can detect the queue (FIFO) fill of a coherent optic when the link comes up, and report this fill value to a clock recovery process. This value between successive link up conditions can be used to calculate a latency differential that can then be applied by the clock recovery process to newly received timestamps (e.g., IEEE 1588v2 PTP, IETF NTP) to compensate for the latency variation (i.e., noise). By compensating for this delay asymmetry, the accuracy of the clock that is then distributed to the application is significantly improved.

This same latency variation compensation can also be applied to a redundant timing network solution where each timing reference is transported over distinct coherent optics paths to a shared device timing trail endpoint. The redundant timing network solution can include multiple master clocks with one being active and others being standby. When a clock reference protection switch is initiated between a pair of these timing references, e.g., between the active and standby such as due to a failure, manual switch, etc., the systems and methods described herein can be used to smooth out the phase jump between the new active clock and the other clocks which synchronize thereto.

The benefit of time error compensation for coherent optical modems not only improves the accuracy of a distributed clock in a packet network, but also enables the number of network elements in the timing trail to be increased. An on-ramp mapper shall communicate its ingress/mapping FIFO fills to the far end node, this far end node can then use the mapper FIFO fill and its local demapper/off-ramp FIFO fill level to determine the modem's contribution to the unidirectional path's latency.

In FIG. 4, the process 100 includes, at a first node 12A, measuring fill levels of a queue and signaling this first node measurement to a clock 13B (step 101); at the second node 12B, receiving the first node measurement and measuring fill levels of its queue(s) and signaling this second node measurement to the clock 13B (step 102); at the clock 13B, analyzing the first node measurement and the second node measurement to determine the difference between the first node's delay and the second node's delay (step 103); and at the clock 13B, performing an adjustment to the output phase of the clock 13B based on the difference in forward and reverse delays to compensate for the time error that results from the delay asymmetry (step 104).

The process 100 uses the queue fill values of two different coherent optics to compensate for the difference in latency in the forward and reverse paths. These values can be communicated to the clock 13B which calculates the delay asymmetry and compensates for it. This communication can be in-band and/or out-of-band using various techniques such as GCC, OSC, Ethernet, etc.

In the process 100, any coherent optics in the path measure the fill level of their elastic FIFO and signal this information to the downstream clock. The downstream clock uses the fill level information that it receives to calculate the forward and reverse delays introduced by these FIFOs. The downstream clock also calculates the difference between the upstream and downstream delays and applies an asymmetry correction to its output clock, thus removing the time error that would have resulted from the delay asymmetry. The representation of the downstream clock could be equally the upstream clock, allowing for the upstream clock to apply the compensation factor, in the event the downstream clock does not have the ability to apply such a compensation. If both upstream and downstream clocks support cTE compensation, then only one clock should be configured to apply the compensation, but either could be used.

In FIG. 5, the process 150 includes receiving a desired value of time delay (step 151); monitoring a fill level of a queue (step 152); performing adjustment of one or more of a phase of a clock or justification control signals to drive the fill level of the queue, to address any difference between the desired value and the monitored fill level (step 153); and signaling the adjustment to a downstream node (step 154).

The process 150 uses the variation in queue fill values of a single coherent optic to compensate for the latency variation introduced by those queues. In the process 150, a coherent optical modem measures the fill level of its elastic FIFO and calculates the offset from the desired value. It then applies an adjustment to the phase of its clock, or justification control signals to drive the fill level to the desired value. The result is that latency of the coherent optics will be constant and the upstream and downstream delays of a pair of connected coherent optics will be matched, thus removing the time error that would have resulted if the delays were not matched. While the FIFO fill level is being adjusted, the coherent optical modem can signal the fill level status (e.g., fill level equal to or not equal to a desired value) to the downstream clock so that it can take appropriate action at the synchronization layer (e.g., adjust advertised clock, enter holdover, etc.).

The processes 100, 150 generally rely on software to read FIFO fill levels, i.e., extract the hardware state to provide a technique for compensating for the delay asymmetry. The benefit of time error compensation for coherent optical modems time error not only improves the accuracy of a distributed clock in a packet network, but also enables the number of network elements in the timing trail to be increased. An on-ramp mapper shall communicate its ingress/mapping FIFO fills to the far end node, this far end node can then use the mapper FIFO fill and its local demapper/off-ramp FIFO fill level to determine the modem's contribution to the unidirectional path's latency.

Process of Compensating Coherent Optics Delay Asymmetry in a Packet Network

Process 100 or process 150 can be employed by network nodes to compensate for delay asymmetry introduced by coherent optics. The compensation process may be executed a single time after a link between nodes is established. If the link is interrupted and reestablished, the compensation process can be executed again. Alternatively, the compensation process may be executed continuously.

Figure 6:
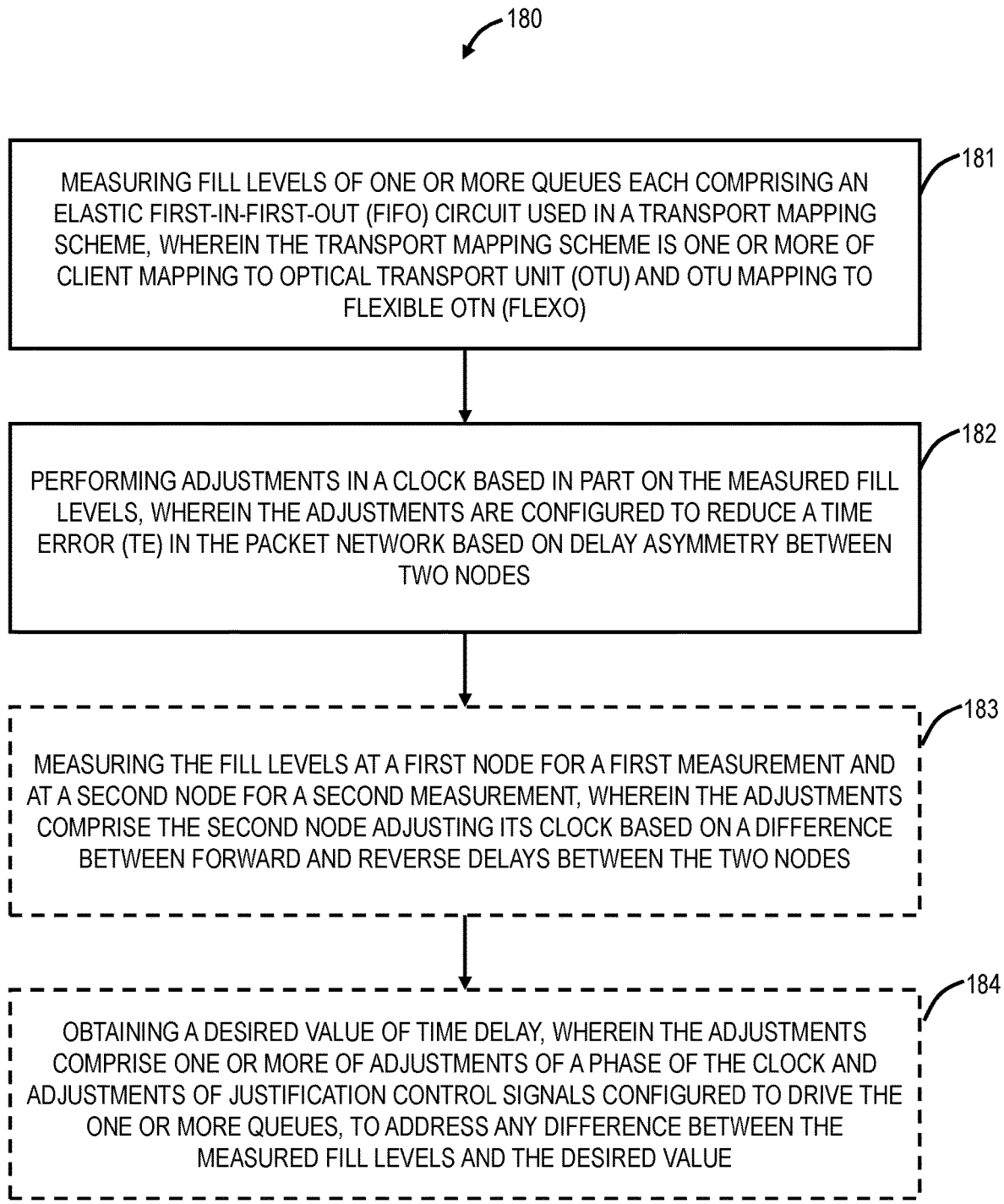
FIG. 6 is a flowchart of a process of compensating coherent optics time error in a packet network.

FIG. 6 is a flowchart of a process 180 of compensating coherent optics time error in a packet network. The process 180 includes measuring fill levels of one or more queues each including an elastic First-In-First-Out (FIFO) circuit used in a transport mapping scheme, wherein the transport mapping scheme is one or more of client mapping to Optical Transport Unit (OTU) and OTU mapping to Flexible OTN (FlexO) (step 181); and performing adjustments in a clock based in part on the measured fill levels, wherein the adjustments are configured to reduce a Time Error (TE) in the packet network based on delay asymmetry between two nodes (step 182).

Optionally, the measuring fill levels includes measuring the fill levels at a first node for a first measurement and at a second node for a second measurement, wherein the adjustments include the second node adjusting its clock based on a difference between difference between forward and reverse delays between the two nodes (step 183). Also, the process 180 can include obtaining a desired value of time delay, wherein the adjustments include one or more of adjustments of a phase of the clock and adjustments of justification control signals configured to drive one or more queues, to address any difference between the measured fill levels and the desired value (step 184).

The processes 100 and 150 can include signaling the measured fill levels or the status of the delay compensation to a remote node. The signaling can utilize one of in-band signaling via Ethernet, in-band signaling via OTN overhead and/or out-of-band signaling through one of an Optical Service Channel (OSC) and/or an out-of-band data channel.

In another embodiment, a coherent optical module includes client-to-Optical Transport Unit (OTU) adaptation circuitry; OTU-to-Flexible OTN (FlexO) adaptation circuitry; Forward Error Correction (FEC) circuitry; and a Digital Signal Processor (DSP), wherein the client-to-OTU adaptation circuitry and the OTU-to-FlexO adaptation circuitry includes one or more queues each including an elastic First-In-First-Out (FIFO) circuit used in a transport mapping scheme, and wherein fill levels of the one or more queues are measured and adjustments are performed to a clock based in part on the measured fill levels, wherein process 100 or 150 is employed to compensate for the delay asymmetry of the coherent optical module.

In a further embodiment, a node in a packet optical network includes a coherent optical module communicatively coupled to a remote node in the packet network, wherein the coherent optics module includes client-to-Optical Transport Unit (OTU) adaptation circuitry; OTU-to-Flexible OTN (FlexO) adaptation circuitry; Forward Error Correction (FEC) circuitry; and a Digital Signal Processor (DSP), wherein the client-to-OTU adaptation circuitry and the OTU-to-FlexO adaptation circuitry include one or more queues each including an elastic First-In-First-Out (FIFO) circuit used in a transport mapping scheme, and wherein process 100 or 150 is employed to compensate for the delay asymmetry of the coherent optical module.

Fiber Asymmetry

Also, existing approaches for measuring fiber delay propagation asymmetry require a technician to either manually physically measure each fiber prior to deployment to ensure fiber symmetry, or to measure each fiber at the time of deployment to identify their distances and manually configure the transmit and receive distances on each slave clock. Both current approaches require manual intervention leading to a very high operational cost and are prone to error during configuration. Also, these approaches do not work well with optical protection switching where there can be varying optical paths.

The use of IEEE 1588v2 protocol for the distribution of frequency, phase, and time-of-day clocks in a packet network assumes that the propagation latency in each transport direction of a timing trail in the network is equal. Any propagation latency differential between the transmit and receive paths is referred to as delay asymmetry. The delay asymmetry will result in a time error in the recovered clock. The technique described here can be used with a measure of the propagation latency directly, or indirectly. Indirectly, fiber has a propagation latency performance at manufacture time that is measured as μs/km (or ns/m). The actual propagation latency can be derived from the product of the measured fiber distance and the propagation latency performance of the fiber and propagation of the wavelength (color).

The systems and methods also provide a technique for modems to automatically measure the fiber latency in each direction utilizing an Optical Time Domain Reflectometer (OTDR) and report both the transmit and receive measurements to a slave clock recovery process (i.e., clock servo). The reported latencies can be used to compensate for the propagation asymmetry in the timing trail to produce a more accurate recovered clock.

For a slave clock to receive the fiber latencies of both transmit and receive directions, the modem must also be able to obtain measurements in both directions. However, OTDR is unidirectional, capable of measuring transmit path only. This necessitates that each pair of peering modems measure their transmit paths, and have the remote peer signal using an out-of-band (e.g., Optical Service Channel (OSC) or North Bound Interface (NBI) to a Network Management System (NMS) or Controller) or other in-band communications channel (e.g., GCC, Ethernet) back to the modem on the slave clock end, its transmit fiber latency. The modem at the slave clock end could then report both its own transmit fiber latency and the signaled receive fiber latency to the clock recovery process.

In addition to measuring the end-to-end latencies between a pair of OTDR equipped modems, it is also possible to apply this technique to optical fiber segments between modem-to-amplifier, or amplifier-to-amplifier. When optical fiber segments are measured, each amplifier along the end-to-end path could signal their measured fiber latencies either in-band or out-of-band using the same signaling channels or NBI to allow the accumulation of each segment to be reported to the modem endpoints and the software at those endpoints to enable delay asymmetry compensation.

A typical fiber propagation delay is 4.9 ns per meter. Therefore, each meter of length asymmetry equates to 4.9 ns of delay asymmetry, resulting in 4.9/2 ns of time error in the recovered clock, which can amount to a significant portion of a network's time error budget. The ability to compensate for a majority of the time error contributed by fiber asymmetry improves the performance (i.e., clock accuracy) and dimension scale of a packet network timing solution.

Each fiber direction would need to be measured for latency, and either end could report back to the other modem its measurement. This would allow either the master or the slave clock to apply the asymmetry compensation. The use of a North Bound Interface to signal or configure the remote peer with its fiber latency measurement could be automatically configured on the modem endpoints or directly in the master, boundary, transparent, or slave clock, by the NMS or Controller to automate the process of auto-measuring fiber asymmetry.

Example Network Element/Node

Figure 7:
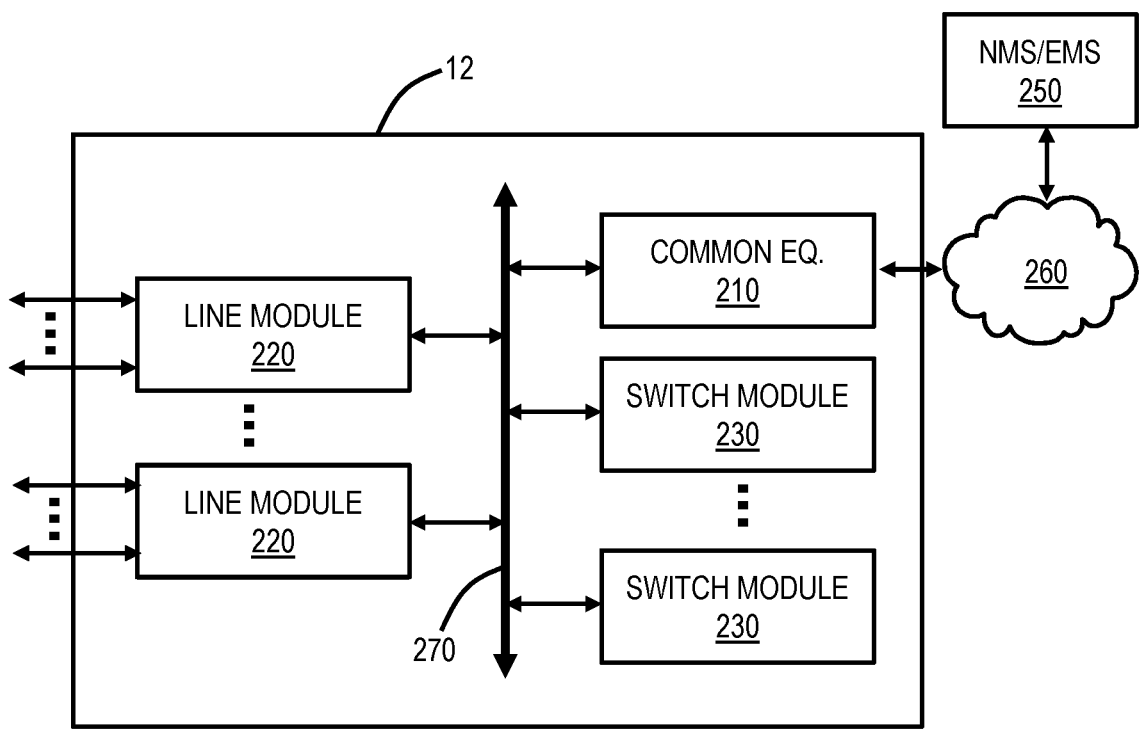
FIG. 7 is a block diagram of an example node for use with the systems and methods described herein.

FIG. 7 is a block diagram of an example node 12 for use with the systems and methods described herein. In an embodiment, the example node 12 can be a network element that may consolidate the functionality of a Multi-Service Provisioning Platform (MSPP), Digital Cross-Connect (DCS), Ethernet and/or Optical Transport Network (OTN) switch, Dense Wave Division Multiplexed (DWDM) platform, etc. into a single, high-capacity intelligent switching system providing Layer 0, 1, and/or 2 consolidation. In another embodiment, the node 12 can be any of an OTN Add/Drop Multiplexer (ADM), ROADM, a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 12 can be any digital system with ingress and egress digital signals and switching therebetween of channels, timeslots, tributary units, etc. and/or photonic system with ingress and egress wavelengths and switching therebetween (ROADM). While the node 12 is generally shown as an optical network element, the systems and methods contemplated for use with any switching fabric, network element, or network-based thereon.

In an embodiment, the node 12 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller 300 illustrated in FIG. 8, configured to operate the control plane as described herein. The node 12 can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links to/from the node 12. In an embodiment, the line modules 220 can form ingress and egress switches with the switch modules 230 as center stage switches for a three-stage switch, e.g. a three-stage Clos switch. Other configurations and/or architectures are also contemplated. The line modules 220 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between or beyond. The line modules 220 can include wavelength division multiplexing interfaces, short reach interfaces, and the like, and can connect to other line modules 220 on remote network elements, end clients, edge routers, and the like, e.g. forming connections on the links 14E, 14W in the network 10. From a logical perspective, the line modules 220 provide ingress and egress ports to the node 12, and each line module 220 can include one or more physical ports. The switch modules 230 are configured to switch channels, wavelengths, timeslots, tributary units, packets, etc. between the line modules 220.

Those of ordinary skill in the art will recognize the node 12 can include other components which are omitted for illustration purposes, and that the systems and methods described herein are contemplated for use with a plurality of different network elements with the node 12 presented as an example type of a network element. For example, in another embodiment, the node 12 may not include the switch modules 230, but rather have the corresponding functionality in the line modules 220 (or some equivalent) in a distributed fashion. For the node 12, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the node 12 is merely presented as one example node 12 for the systems and methods described herein.

Example Controller

Figure 8:
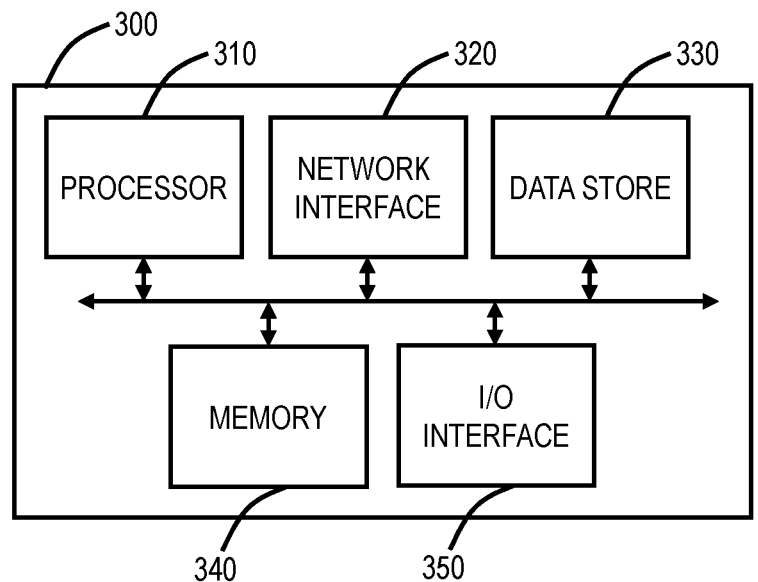
FIG. 8 is a block diagram of a controller to provide control plane processing and/or Operations, Administration, Maintenance, and Provisioning (OAM&P) for the node of FIG. 7.

FIG. 8 is a block diagram of a controller 300 to provide control plane processing and/or operations, administration, maintenance, and provisioning (OAM&P) for the node 12. The controller 300 can be part of the common equipment, such as the common equipment 210 in the node 12, or a stand-alone device communicatively coupled to the node 12 via the DCN 260. The controller 300 can include a processor 310 which is a hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within the memory, to communicate data to and from the memory, and to generally control operations of the controller 300 pursuant to the software instructions. The controller 300 can also include a network interface 320, a data store 330, memory 340, an Input/output (I/O) interface 350, and the like, all of which are communicatively coupled therebetween and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate to other devices. Further, the I/O interface 350 includes components for the controller 300 to communicate with the other nodes, such as using overhead associated with OTN signals.

In an embodiment, the controller 300 is configured to communicate with other controllers 300 in the network 10 to operate the control plane for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. Other mechanisms are also contemplated for control plane signaling. Note, the process 150 can utilize any of the above for communicating time information between the nodes 12A, 12B.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of compensating coherent optical modems delay asymmetry in a packet optical network, comprising:
obtaining measured fill levels of one or more queues each comprising an elastic First-In-First-Out (FIFO) circuit used in a transport mapping scheme, wherein the transport mapping scheme is one or more of client mapping to Optical Transport Unit (OTU) and OTU mapping to Flexible OTN (FlexO); and
performing adjustments in a clock based in part on the measured fill levels, wherein the adjustments are configured to reduce a Time Error (TE) in the packet network based on delay asymmetry between two nodes wherein the measured fill levels are the measured fill levels at a first node for a first measurement and at a second node for a second measurement, wherein the adjustments comprise the first node adjusting its clock based on a difference between forward and reverse delays between the two nodes, determined based on the first measurement and the second measurement.

2. The method of claim 1, further comprising:
signaling the measured fill levels to a remote node.

3. The method of claim 2, wherein the signaling utilizes one of in-band signaling via overhead and/or out-of-band signaling through one of an Optical Service Channel (OSC) and/or an out-of-band data channel.

4. The method of claim 1, further comprising:
obtaining a desired value of time delay, wherein the adjustments comprise one or more of adjustments of a phase of the clock and adjustments of justification control signals configured to drive the one or more queues, to address any difference between the measured fill levels and the desired value.

5. The method of claim 1, wherein the clock is utilized to implement one or more of IEEE 1588 Precision Time Protocol (PTP), Network Time Protocol (NTP), or other packet timing protocol using a clock servo for clock recovery.

6. The method of claim 1, further comprising:
signaling the adjustments to one or more nodes in the packet optical network.

7. A coherent optical module, comprising:
client-to-Optical Transport Unit (OTU) adaptation circuitry;
OTU-to-Flexible OTN (FlexO) adaptation circuitry;
Forward Error Correction (FEC) circuitry; and
a Digital Signal Processor (DSP),
wherein the client-to-OTU adaptation circuitry and the OTU-to-FlexO adaptation circuitry comprise one or more queues each comprising an elastic First-In-First-Out (FIFO) circuit used in a transport mapping scheme,
wherein the adjustments are configured to reduce a Time Error (TE) in the packet network based on delay asymmetry between two nodes, and
wherein the coherent optical module is configured to perform a first measurement of fill levels and to obtain a second measurement of fill levels from a second node and wherein a first node including the coherent optical module is configured to perform the adjustments on its clock based on a difference between forward and reverse delays between the first node and the second node, determined based on the first measurement and the second measurement.

8. The coherent optical module of claim 7, wherein the coherent optical module is configured to signal the first measurement to a remote node.

9. The coherent optical module of claim 8, wherein the coherent optical module utilizes one of in-band signaling via overhead and/or out-of-band signaling through one of an Optical Service Channel (OSC) and an out-of-band data channel.

10. The coherent optical module of claim 7, wherein a desired value of time delay is obtained, wherein the adjustments comprise one or more of adjustments of a phase of the clock and adjustments of justification control signals configured to drive the one or more queues, to address any difference between the measured fill levels and the desired value.

11. The coherent optical module of claim 7, wherein the clock is utilized to implement one or more of IEEE 1588 Precision Time Protocol (PTP), Network Time Protocol (NTP), or other packet timing protocol using a clock servo for clock recovery.

12. The coherent optical module of claim 7, wherein the coherent optical module is configured to signal the adjustments to one or more nodes in the packet optical network.

13. A coherent optical module, comprising:
client-to-Optical Transport Unit (OTU) adaptation circuitry;
OTU-to-Flexible OTN (FlexO) adaptation circuitry;
Forward Error Correction (FEC) circuitry; and
a Digital Signal Processor (DSP),
wherein the client-to-OTU adaptation circuitry and the OTU-to-FlexO adaptation circuitry comprise one or more queues each comprising an elastic First-In-First-Out (FIFO) circuit used in a transport mapping scheme,
wherein fill levels of the one or more queues are measured and adjustments are performed to a clock based in part on the measured fill levels, wherein the adjustments are configured to reduce a Time Error (TE) in the packet network based on delay asymmetry between two nodes, and
wherein the coherent optical module is configured to signal the adjustments to one or more nodes in the packet optical network.

14. The coherent optical module of claim 13, wherein the coherent optical module is configured to perform a first measurement of fill levels and to obtain a second measurement of fill levels from a second node, and wherein a first node including the coherent optical module is configured to perform the adjustments on its clock based on a difference between forward and reverse delays between the first node and the second node, determined based on the first measurement and the second measurement.

15. The coherent optical module of claim 13, wherein the coherent optical module is configured to signal the measured fill levels to a remote node.

16. The coherent optical module of claim 15, wherein the coherent optical module utilizes one of in-band signaling via overhead and/or out-of-band signaling through one of an Optical Service Channel (OSC) and an out-of-band data channel.

17. The coherent optical module of claim 13, wherein a desired value of time delay is obtained, wherein the adjustments comprise one or more of adjustments of a phase of the clock and adjustments of justification control signals configured to drive the one or more queues, to address any difference between the measured fill levels and the desired value.

18. The coherent optical module of claim 13, wherein the clock is utilized to implement one or more of IEEE 1588 Precision Time Protocol (PTP), Network Time Protocol (NTP), or other packet timing protocol using a clock servo for clock recovery.

* * * * *